United States Patent
Magee et al.

(10) Patent No.: US 10,389,285 B2
(45) Date of Patent: Aug. 20, 2019

(54) STATOR RESISTANCE ESTIMATION FOR ELECTRIC MOTORS

(71) Applicant: TEXAS INSTRUMENTS INCORPORATED, Dallas, TX (US)

(72) Inventors: David Patrick Magee, Allen, TX (US); Andre Veltman, Culemborg (NL); Jorge Zambada, San Diego, CA (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 15/804,825

(22) Filed: Nov. 6, 2017

(65) Prior Publication Data

US 2018/0076749 A1    Mar. 15, 2018

Related U.S. Application Data

(63) Continuation of application No. 15/200,294, filed on Jul. 1, 2016, now Pat. No. 9,813,005, which is a continuation of application No. 14/486,303, filed on Sep. 15, 2014, now Pat. No. 9,413,282.

(60) Provisional application No. 61/886,331, filed on Oct. 3, 2013.

(51) Int. Cl.
  *H02P 21/14*   (2016.01)
  *H02P 21/24*   (2016.01)

(52) U.S. Cl.
  CPC .............. *H02P 21/14* (2013.01); *H02P 21/24* (2016.02)

(58) Field of Classification Search
  CPC ...................................... H02P 21/14
  USPC .............................. 318/400.02, 400.01, 700
  See application file for complete search history.

(56) References Cited

U.S. PATENT DOCUMENTS

| 5,502,360 | A | 3/1996 | Kerkman et al. |
|---|---|---|---|
| 5,909,018 | A | 6/1999 | Vecchiotti et al. |
| 6,069,467 | A * | 5/2000 | Jansen .................... H02P 6/183 318/801 |
| 6,636,012 | B2 | 10/2003 | Royak et al. |

(Continued)

OTHER PUBLICATIONS

Kang, Jun, "Sensorless Control of Permanent Magnet Motors," Yaskawa Electric America Inc., Control Engineering, Apr. 1, 2010 (2 pages).

(Continued)

*Primary Examiner* — David Luo
(74) *Attorney, Agent, or Firm* — Ebby Abraham; Charles A. Brill; Frank D. Cimino

(57) ABSTRACT

A method of controlling an electric motor (motor) includes providing a processor having an associated memory storing a stator resistance (Rs) estimation (RSE) algorithm that is programmed to implement the RSE algorithm to execute steps including injecting a current waveform at an arbitrary frame of reference into the stator using a field-oriented-control (FOC) motor controller including an Id controller and an Iq controller, and measuring current and voltage values from the motor responsive to the injecting. The measured current and voltage values are then transformed into transformed current and voltage values in a d/q coordinate system. The transformed current and voltage values are low pass filtered to generate filtered d/q current and voltage values, and a value for Rs is estimated from the filtered d/q current and voltage values. The arbitrary frame of reference can be a time-varying frame of reference.

15 Claims, 4 Drawing Sheets

(56) References Cited

U.S. PATENT DOCUMENTS

| | | | |
|---|---|---|---|
| 7,969,112 B2 * | 6/2011 | Piippo | H02P 21/13 318/609 |
| 8,373,379 B2 | 2/2013 | Gao et al. | |
| 8,384,338 B2 | 2/2013 | Lu et al. | |

OTHER PUBLICATIONS

Prosecution History for U.S. Appl. No. 15/200,294, dated Jul. 1, 2016 to Oct. 18, 2017 (80 pages).

* cited by examiner

STATOR RESISTANCE ESTIMATION FOR ELECTRIC MOTORS

CROSS REFERENCE TO RELATED APPLICATIONS

This is a continuation application of U.S. patent application Ser. No. 15/200,294, filed Jul. 1, 2016, which is a continuation application of and claims priority to U.S. patent application Ser. No. 14/486,303, filed Sep. 15, 2014, which application claims priority to and the benefit of Provisional Application No. 61/886,331, filed Oct. 3, 2013, all of which are herein incorporated by reference in their entirety.

FIELD

Disclosed embodiments relate to electric motors, and, more particularly, to determining a stator resistance for use by electric motor controllers for speed control of the electric motor.

BACKGROUND

An electric motor is a machine that converts electrical energy into mechanical energy. Electric motors include DC motors and AC motors, with AC motors increasingly being used.

AC motor is driven by 3-phase alternating current (AC) provided by an electric motor controller coupled to a 3-phase inverter. The AC motor includes an outside stationary stator having coils supplied with alternating current to produce a rotating magnetic field, and an inside rotor attached to the output shaft that is given a torque by the rotating field. The interaction of the rotor field and the stator field causes rotation of the rotor which can be used to perform work.

AC motors include induction or asynchronous motors which rely on a small difference in speed between the rotating magnetic field and the rotor to induce rotor current. A second AC motor type is the synchronous motor, which does not rely on induction and as a result can rotate at the supply frequency, or a sub-multiple of the supply frequency. The magnetic field on the rotor is either generated by a current delivered through slip rings or by a permanent magnet.

Stator resistance (Rs) is known to change with temperature, and stator winding temperature is known to increase as the average current through the stator winding increases. Thus, in a variable speed motor, when the drive voltage and current coupled into by the 3-phase inverter is increased or decreased, Rs is subject to change which in turn results in an unexpected demand in stator voltage. In order to achieve accurate motor control, accurate determination of Rs is needed. One method to determine Rs is by injecting DC current test signals into the stator windings and observing resulting variations in the phase currents and voltages of the motor.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments describe methods for determining the stator resistance (Rs) of electric motors, such as for AC motors (e.g., a Permanent Magnet (PM) motor, Interior Permanent Magnet (IPM) motor, or induction motor) or for brushless DC motors. Because the Rs value changes (increases) as the motor heats up due to various loading conditions, accurate dynamic determination of the Rs value is recognized to be needed to run estimators based on a motor model run by the motor controller with enough accuracy in order to operate the estimators successfully.

Disclosed embodiments include Rs estimation (RSE) algorithms that include injecting a low frequency current signal into the stator windings using a Field Oriented Control (FOC) controller including an Id controller for controlling direct (d) current and an Iq controller for controlling quadrature (q) current such that the FOC current controller can track the resulting current waveform(s), and then measuring the resulting current and voltage signals. Unlike known methods for determining (estimating) Rs, disclosed embodiments use an injection signal at an arbitrary frame of reference to determine Rs.

FOC is also called vector control which is known to be a variable frequency drive (VFD) control method that applies generally to all electric motors where there is access to the d axis component of the current (Id) to enable closing a loop on Id, which FOC does. FOC can control the output of three-phase AC electric motors by using two controllable VFD inverter output variables or can control the output of brushless DC motors. Disclosed RSE algorithms transform the measured current and voltage values into the d/q coordinate system followed by low pass filtering as a low frequency model approximation is used to generate filtered d/q current and voltage values, and then the Rs value is estimated from the d/q filtered current and voltage values.

BRIEF DESCRIPTION OF THE DRAWINGS

Reference will now be made to the accompanying drawings, which are not necessarily drawn to scale, wherein.

DETAILED DESCRIPTION

Figure 1:
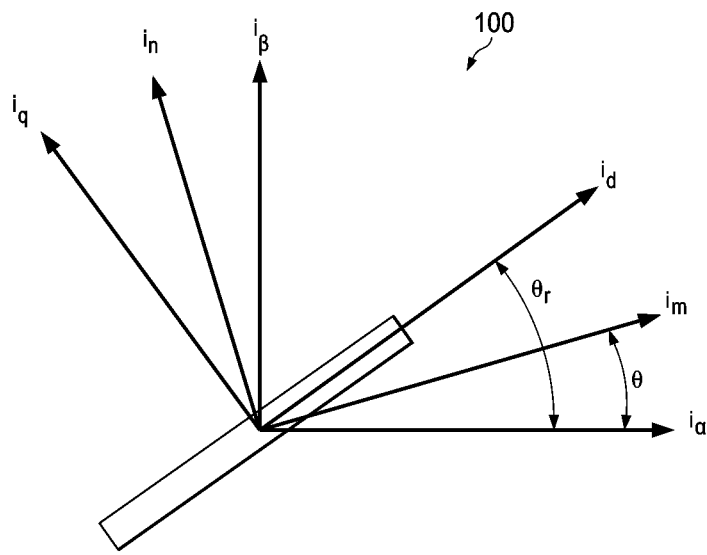
FIG. 1 is a depiction relating the angles of rotor coordinate systems ($\alpha/\beta$) and (d/q) and an arbitrary reference frame (m,n) that is used herein to explain stator model manipulations that enable disclosed RSE algorithms, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

This Disclosure includes RSE algorithms that can dynamically estimate the Rs value of the stator windings of an electric motor while the motor is stationary, or while the motor is rotating. Disclosed RSE algorithms inject a current signal into the stator in an arbitrary reference frame, transform the measured current and voltage values into the d/q coordinate system, and then low pass filter the transformed current and voltage values to provide filtered d/q transformed measured current and voltage signals.

Unlike known methods for estimating Rs, disclosed embodiments use an injection signal at an arbitrary frame of reference to determine Rs. The injection signal can be Id current only, Iq current only, or a combination of Id and Id current to perform Rs estimation. When Iq current is used, an additional torque is introduced into the motor. However, it is recognized if the angle of the injection current signal is time-varying, then the average induced torque level over each period interval will be zero so that the current injection will essentially not change the torque production of the motor.

Figure 4:
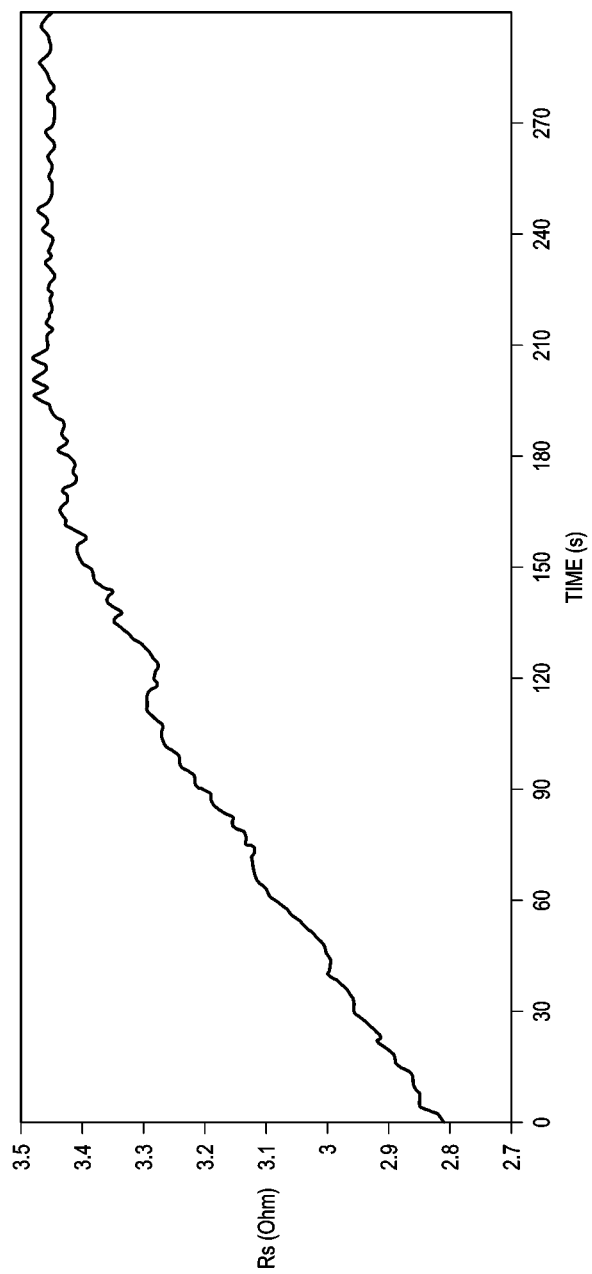
FIG. 4 is a plot of showing experimentally determined Rs tracking results.

The derivation of an RSE algorithm described below is applied to a PM motor model. In the Examples section below relative to FIG. 4, an RSE algorithm applied to a PM motor evidences superior Rs tracking performance for experiments performed in the laboratory.

However, disclosed RSE algorithms are generic in nature for any motor that may be controlled by FOC, which as noted above also generally apply to IPM motors, injection motors and brushless DC motors as the same low frequency models disclosed herein can be used. FOC (or vector control) is known to generate a three-phase pulse width modulation (PWM) motor voltage output derived from a complex voltage vector to control a complex current vector derived from motor's three-phase motor stator current input through projections or rotations back and forth between the three-phase speed and time dependent system and these vectors' rotating reference-frame two-coordinate time invariant system. Such complex stator motor current space vector can be defined in a (d,q) coordinate system with orthogonal components along d (direct) and q (quadrature) axes such that field flux linkage component of current is aligned along the d axis and torque component of current is aligned along the q axis. The induction motor's d,q coordinate system can be superimposed to the motor's instantaneous (a,b,c) three-phase sinusoidal system. Components of the (d,q) system current vector allow conventional control such as proportional and integral (PI) control, as with a DC motor.

It is noted that the d/q reference frame used herein is the European notation. If the American notation for the d/q reference frame was used instead, the direction would be different. Although the math would be somewhat changed, the fundamental principles disclosed herein would still apply and the general current injection equation arrived at (see Equation 5 described below) stays the same, so that one having ordinary skill in the art given this Disclosure would be able to derive a disclosed RSE algorithm using American notation for the d/q reference frame without undue effort.

RSE Algorithm Derivation for d/q Reference Frame Using European Notation

The model of a PM motor with saliency can be shown to be of the following form:

$$\begin{bmatrix} V_\alpha \\ V_\beta \end{bmatrix} = R_s \begin{bmatrix} i_\alpha \\ i_\beta \end{bmatrix} + \lambda_m \frac{d\theta_r}{dt} \begin{bmatrix} -\sin(\theta_r) \\ \cos(\theta_r) \end{bmatrix} +$$ Equation set 1

$$\begin{bmatrix} L_{1s} + \frac{3}{2}L_{0s} - \frac{3}{2}L_{2s}\cos(2\theta_r) & -\frac{3}{2}L_{2s}\sin(2\theta_r) \\ -\frac{3}{2}L_{2s}\sin(2\theta_r) & L_{1s} + \frac{3}{2}L_{0s} + \frac{3}{2}L_{2s}\cos(2\theta_r) \end{bmatrix}$$

$$\begin{bmatrix} \frac{di_\alpha}{dt} \\ \frac{di_\beta}{dt} \end{bmatrix} + \begin{bmatrix} -3L_{2s}\frac{d\theta_r}{dt}\sin(2\theta_r) & 3L_{2s}\frac{d\theta_r}{dt}\cos(2\theta_r) \\ 3L_{2s}\frac{d\theta_r}{dt}\cos(2\theta_r) & 3L_{2s}\frac{d\theta_r}{dt}\sin(2\theta_r) \end{bmatrix} \begin{bmatrix} i_\alpha \\ i_\beta \end{bmatrix}$$

where:
$V_\alpha$, $V_\beta$ are the stator motor voltages in the orthogonal alpha $(\alpha)/(\beta)$ beta coordinate system;
$i_\alpha$, $i_\beta$ are the stator motor currents in the $\alpha/\beta$ coordinate system;
$R_s$ is the stator resistance;
$\lambda_m$ is the magnetizing flux linkage;
$\theta_r$ is the electrical angle of the rotor;
$L_{1s}$ is the leakage inductance;
$L_{0s}$ is the $0^{th}$ order harmonic of the self-inductance;
$L_{2s}$ is the $2^{nd}$ order harmonic of the self-inductance;

$$\frac{d(\cdot)}{dt}$$

is the time rate of change of a given parameter.

Equation set 1 describes the PM motor dynamics in a static $\alpha/\beta$ coordinate system with respect to the stator. The first term to the right of the =sign (Rsxstator motor currents) is the voltage drop due to the ohmic resistance of the stator's windings, the second term (km, magnetizing flux linkage . . . ) is the voltage corresponding to the back EMF of the motor, the third term is the voltage corresponding to the total self-inductance, and the fourth (last) term is the voltage corresponding to the saliency of the motor.

A substitution to Equation set 1 lets $L_0 = L_{1s} + 3/2L_{0s}$ and $\Delta L = 3/2L_{2s}$, yields Equation set 2 below:

$$\begin{bmatrix} V_\alpha \\ V_\beta \end{bmatrix} = R_s \begin{bmatrix} i_\alpha \\ i_\beta \end{bmatrix} + \lambda_m \frac{d\theta_r}{dt} \begin{bmatrix} -\sin(\theta_r) \\ \cos(\theta_r) \end{bmatrix} +$$ Equation set 2

$$\begin{bmatrix} L_0 - \Delta L\cos(2\theta_r) & -L\sin(2\theta_r) \\ -\Delta L\sin(2\theta_r) & L_0 + \Delta L\cos(2\theta_r) \end{bmatrix} \begin{bmatrix} \frac{di_\alpha}{dt} \\ \frac{di_\beta}{dt} \end{bmatrix} +$$

$$\begin{bmatrix} -2\Delta L\frac{d\theta_r}{dt}\sin(2\theta_r) & 2\Delta L\frac{d\theta_r}{dt}\cos(2\theta_r) \\ 2\Delta L\frac{d\theta_r}{dt}\cos(2\theta_r) & 2\Delta L\frac{d\theta_r}{dt}\sin(2\theta_r) \end{bmatrix} \begin{bmatrix} i_\alpha \\ i_\beta \end{bmatrix}$$

Equation set 2 can be transformed from the $\alpha/\beta$ coordinate system into an arbitrary (m/n) orthogonal frame of reference using the following transformation:

$$\begin{bmatrix} V_m \\ V_n \end{bmatrix} = \begin{bmatrix} \cos(\theta) & \sin(\theta) \\ -\sin(\theta) & \cos(\theta) \end{bmatrix} \begin{bmatrix} V_\alpha \\ V_\beta \end{bmatrix}$$

FIG. 1 is a depiction 100 relating the angles of rotor coordinate systems ($\alpha/\beta$) and (d/q) and an arbitrary reference frame (m,n) that is used herein to explain stator model manipulations that enable disclosed RSE algorithms, according to an example embodiment. $\theta$ represents the angle between the $\alpha/\beta$ coordinate system and the arbitrary m/n frame of reference shown in depiction 100. $\theta_r$ denotes the location of the d/q coordinate system relative to $\alpha/\beta$ coordinate system, where the d (direct) coordinate direction (shown as aligned with id) denotes the flux direction. Vm and Vn are the respective stator voltages in the arbitrary m/n coordinate system.

The transformed set of equations shown as Equation set 3 can be written as:

$$\begin{bmatrix} V_m \\ V_n \end{bmatrix} = R_s \begin{bmatrix} i_m \\ i_n \end{bmatrix} + \lambda_m \frac{d\theta_r}{dt} \begin{bmatrix} -\sin(\theta_r - \theta) \\ \cos(\theta_r - \theta) \end{bmatrix} + \quad \text{Equation set 3}$$

$$\begin{bmatrix} L_0 - \Delta L \cos(2(\theta_r - \theta)) & \Delta L \sin(2(\theta_r - \theta)) \\ \Delta L \sin(2(\theta_r - \theta)) & L_0 + \Delta L \cos(2(\theta_r - \theta)) \end{bmatrix}$$

$$\begin{bmatrix} \frac{di_m}{dt} \\ \frac{di_n}{dt} \end{bmatrix} +$$

$$\begin{bmatrix} 2\Delta L \frac{d\theta_r}{dt} \sin(2(\theta_r - \theta)) & 2\Delta L \frac{d\theta_r}{dt} \cos(2(\theta_r - \theta)) \\ 2\Delta L \frac{d\theta_r}{dt} \cos(2(\theta_r - \theta)) & 2\Delta L \frac{d\theta_r}{dt} \sin(2(\theta_r - \theta)) \end{bmatrix} \begin{bmatrix} i_m \\ i_n \end{bmatrix}$$

Solving for the time rate of change in the stator current (di/dt for m and n) as a function of the input voltage (Vm, Vn) yields Equation 4 below:

$$\begin{bmatrix} \frac{di_m}{dt} \\ \frac{di_n}{dt} \end{bmatrix} = \quad \text{Equation 4}$$

$$\frac{1}{L_0^2 - \Delta L^2} \begin{bmatrix} L_0 - \Delta L \cos(2(\theta_r - \theta)) & \Delta L \sin(2(\theta_r - \theta)) \\ \Delta L \sin(2(\theta_r - \theta)) & L_0 + \Delta L \cos(2(\theta_r - \theta)) \end{bmatrix}$$

$$\left\{ \begin{bmatrix} V_m \\ V_n \end{bmatrix} - R_s \begin{bmatrix} i_m \\ i_n \end{bmatrix} - \lambda_m \frac{d\theta_r}{dt} \begin{bmatrix} -\sin(\theta_r - \theta) \\ \cos(\theta_r - \theta) \end{bmatrix} - \right.$$

$$\left. \begin{bmatrix} 2\Delta L \frac{d\theta_r}{dt} \sin(2(\theta_r - \theta)) & 2\Delta L \frac{d\theta_r}{dt} \cos(2(\theta_r - \theta)) \\ 2\Delta L \frac{d\theta_r}{dt} \cos(2(\theta_r - \theta)) & 2\Delta L \frac{d\theta_r}{dt} \sin(2(\theta_r - \theta)) \end{bmatrix} \begin{bmatrix} i_m \\ i_n \end{bmatrix} \right\}$$

It is recognized if only the low frequency components of the motor model reflected in Equation 4 are considered which can be obtained by low pass filtering the m, n current and voltage values, the motor dynamics simplify to the following form in Equation 5 below:

$$\begin{bmatrix} 0 \\ 0 \end{bmatrix} = \begin{bmatrix} V_m \\ V_n \end{bmatrix} - R_s \begin{bmatrix} i_m \\ i_n \end{bmatrix} \quad \text{Equation 5}$$

As a result, it can be seen from Equation 5 that Rs can be determined by injecting a current signal into the stator in one or both of the arbitrary directions (m and/or n) and evaluating the resulting current and voltage. For example, if the following constant current injection waveform in the m direction is commanded by a FOC controller in the m/n coordinate system:

$$\begin{bmatrix} i_m \\ i_n \end{bmatrix} = \begin{bmatrix} i_{mag} \\ 0 \end{bmatrix}$$

Since In=0, then Vn=0, and since $i_m = I_{mag}$, Rs can be computed from Equation 5 which reduces to the following:

$$R_s = \frac{V_m}{I_{mag}}$$

It is noted that the angle $\theta$ that defines the location of the m direction reference frame (relative to the $\alpha$ coordinate direction, see FIG. 1) for the injected current is arbitrary, and $\theta$ can be time-varying which is recognized to enable more flexibility in the algorithm and improved sensitivity. For example, one can use a q current which might have larger signal to noise ratio (SNR) as compared to a d current. A $\theta$ time-varying injection current can be expressed in the d/q coordinate system using the new definition shown below with its id and iq components as follows:

$$\begin{bmatrix} i_d \\ i_q \end{bmatrix} = \begin{bmatrix} I_{mag} \cos((\theta_r - \theta)) \\ -I_{mag} \sin((\theta_r - \theta)) \end{bmatrix}$$

The definition above can be used as the input (Idq) to a FOC controller in the d/q coordinate system, such as shown a $I_{dq}$ input to RSE algorithm block 215 of the motor controller (FOC controller) 220 shown in FIG. 2A described below. By taking this form, the resulting $I\alpha\beta$ current is as follows:

$$\begin{bmatrix} i_\alpha \\ i_\beta \end{bmatrix} = \begin{bmatrix} I_{mag} \cos(\theta_r) \\ I_{mag} \sin(\theta_r) \end{bmatrix}$$

where the $I\alpha\beta$ current is seen to be a fixed amplitude current phasor rotating in time with period $\theta r$ in the fixed $\alpha/\beta$ coordinate system.

Disclosed algorithms utilizing a time-varying angle $\theta$ for current injection are different from known DC injection methods that used a fixed injected current angle $\theta$ for injecting a DC current onto a given motor phase. Disclosed RSE algorithms are unlike known RSE algorithms that use a fixed current level (at a constant angle) which tend to generate additional torque in the motor, which can lead to inefficiency and/or unwanted torque disturbances. Moreover, as noted above, disclosed current injection using a time-varying injection signal enables the average induced torque level over a periodic interval to be zero, so that the current injection does not change the torque production of the motor.

Figure 2A:
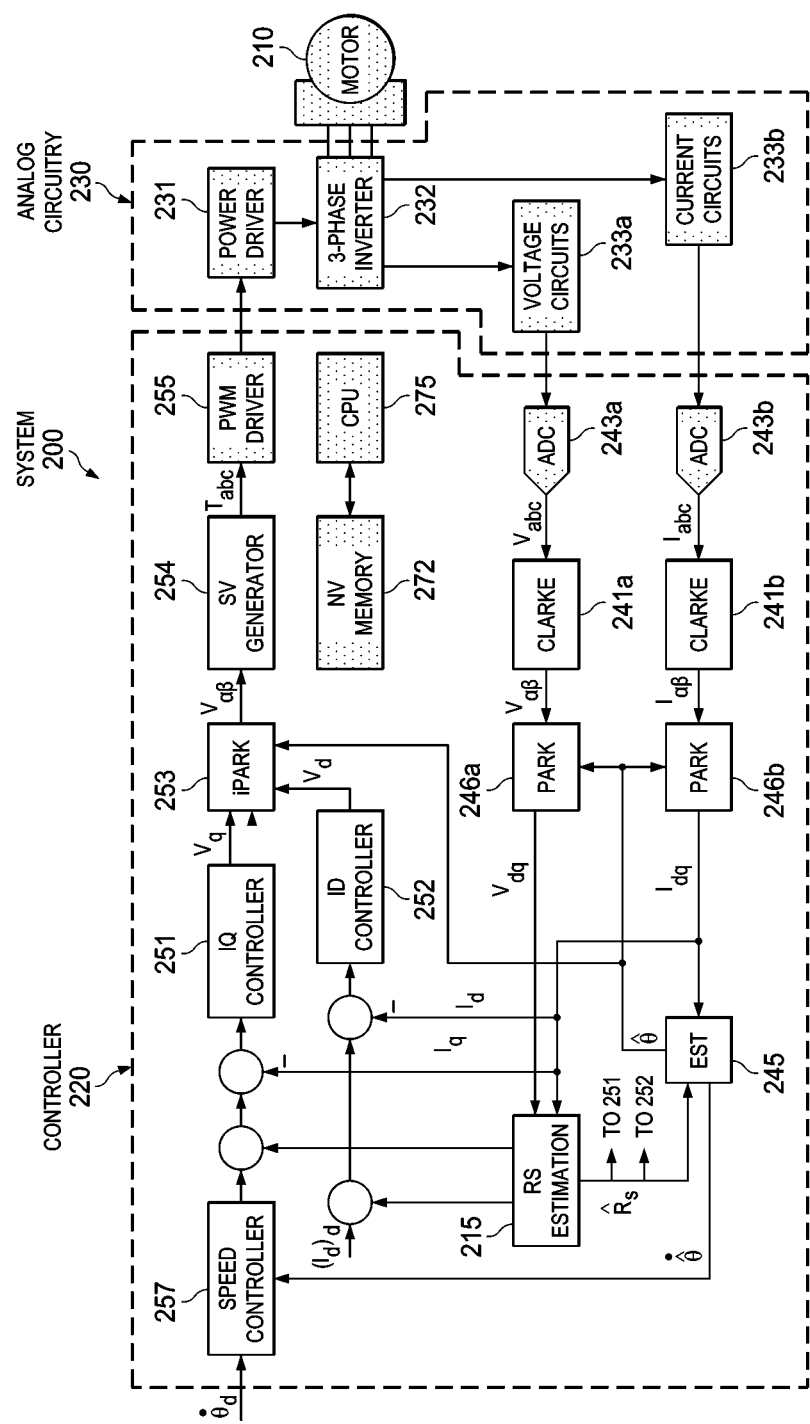
FIG. 2A depicts a block diagram depiction of a control system with run-time Rs estimation including a FOC controller, according to an example embodiment.

FIG. 2A shows an example block diagram depiction of a FOC controlled motor system 200 having a disclosed RSE algorithm block 215 integrated within a FOC controller 220 that controls an AC motor 210 shown as a three-phase motor, according to an example embodiment. FOC controller 220 includes a non-volatile (NV) memory 272, such as read only memory (ROM) or static random access memory (SRAM), and a processor shown as a central processing unit (CPU) 275 that implements in software all the blocks shown in the unshaded (non-dotted) blocks shown in FIG. 2A. Hardware components of system 200 such as CPU 275 and NV 272 are shown in dotted blocks to distinguish them from components of system 200 implemented in software.

System 200 also includes analog circuitry 230 between the FOC controller 220 and the motor 210 comprising power driver 231, 3-phase inverter 232, voltage measurement circuits 233a and current measurement circuits 233b. The controller 220 includes analog-to-digital converters (ADC's) 243a and 243b coupled to receive outputs from the voltage measurement circuit 233a shown as "voltage circuits" and current measurement circuit 233b shown as "current circuits", and a PWM driver 255 for driving the power driver 231.

The FOC controller 220 can be a sensorless FOC controller or can be a FOC controller having a sensor. FOC controllers having sensors can include encoders and sensors that measure position directly and then estimate the angular speed therefrom. FOC controller 220 can be implemented by a MCU, such as the MCU chip 260 shown in FIG. 2B described below. Circuitry other than a MCU can also be used to realize FOC controller 220 implementing a disclosed RSE algorithm 215, such as coprocessors or accelerators built using application-specific integrated circuit (ASIC) logic gates.

The inputs to the RSE algorithm block 215 are the measured current values from the stator of the motor 210 in the d/q coordinate system ($I_{dq}$), and the measured voltage values from the stator in the d/q coordinate system ($V_{dq}$). The outputs from the RSE algorithm block (RSE block) 215 are the injection currents in the d/q coordinate system which are added to the input of the Id current controller 252 and to the input of the Iq current controller 251 as shown in FIG. 2A. The estimated Rs value shown as $\tilde{R}_s$ output by RSE block 215 is coupled to an estimator block shown as Est block 245. $\tilde{R}_s$ is also shown coupled to an input of Id current controller 252 and to an input of the Iq current controller 251. The Idq current values are also input into the Est block 245, which generates an angle estimate $\hat{\theta}$ and angular velocity estimate $\dot{\hat{\theta}}$. The respective injection currents in the d/q coordinate system output by RSE block 215 are provided to inputs of the Iq controller 251 and Id controller 252 as additional references to the summing points shown.

The outputs of the Iq controller 251 and Id controller 252 are coupled to an iPark block 253 which outputs $V\alpha\beta$ that is coupled to SV generator block 254, where the output of SV generator block 254 is coupled to PWM driver 255. The SV generator computes the PWM time durations for each phase of the motor to produce the desired $V\alpha\beta$ voltage values.

As Iq controller 251 and Id controller 252 both receive $\tilde{R}_s$, they can dynamically adjust their gain as Rs changes to keep their open loop control bandwidth essentially the constant. Keeping the open loop control bandwidth of Iq controller 251 and Id controller 252 essentially constant is recognized to have the advantage of improving the stability of the FOC controller 220 through dynamic pole cancellation as described in more detail below.

It is noted that the voltage values $V_{dq}$ is estimated from the measured phase voltages from the stator of the motor 210. The blocks shown as "Clarke" block 241a and Clarke block 241b perform the known Clarke transformation and the Park blocks 246a, 246b perform the known Park transformation. The Rs value is provided to Est block 245 which provides an estimate of θ shown as $\hat{\theta}$ with the hat denoting an estimated value (regarding θ, see θ in depiction 100 in FIG. 1) based on a motor model that is provided to the Park blocks 246a and 246b and $\hat{\theta}$ with a dot (.) above to denote estimate angular velocity which is provided to a speed controller 257.

Figure 2B:
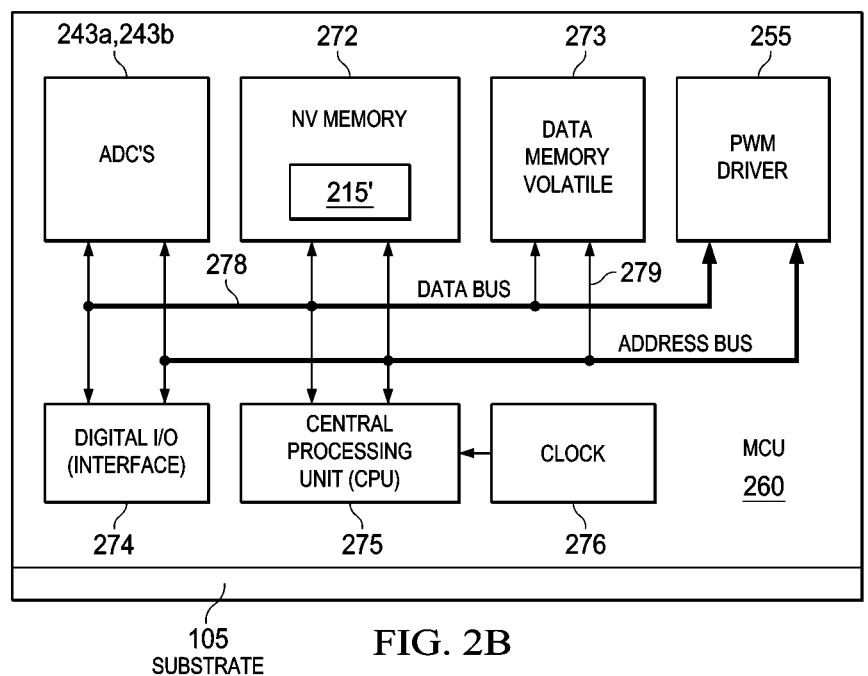
FIG. 2B is a block diagram depiction of an example microcontroller unit (MCU) chip implementing the FOC controller shown in FIG. 2A, according to an example embodiment.

FIG. 2B is a block diagram depiction of an example MCU chip 260 formed in and on a substrate 105 implementing the FOC controller 220 shown in FIG. 2A, according to an example embodiment. Although not shown, the MCU chip 260 generally includes other integrated circuit modules, for example, a Universal Serial Bus (USB) controller and a transceiver. MCU chip 260 is shown including NV memory 272, volatile data memory 273, digital I/O (interface) 274, CPU 275, and clock (or timer) 276. Core for implementing RSE algorithm block 215 is shown as block 215' stored in NV memory 272. MCU chip 260 is also shown including a digital data bus 278 and an address bus 279.

MCU chip 260 is shown as a monolithic integrated circuit (IC). The substrate 105 may comprise silicon, such as bulk silicon or silicon epi on a bulk silicon substrate. The substrate 105 may also generally comprise other materials, such as elementary semiconductors besides silicon including germanium. Substrate 105 may also generally comprise a compound semiconductor.

Figure 3:
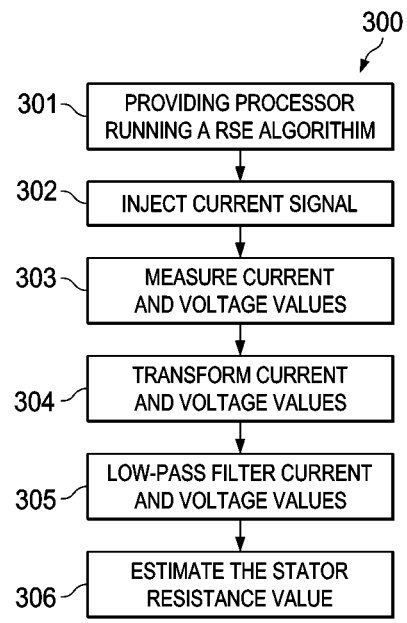
FIG. 3 is a flow chart that shows steps for an example run-time RSE method, according to an example embodiment.

A flowchart of an example run-time RSE algorithm for implementing a method 300 of controlling an electric motor is shown in FIG. 3. Step 301 comprises providing a FOC controller including a processor having an associated memory storing a RSE algorithm, where the processor is programmed to implement the RSE algorithm to execute a series of steps. Step 302 comprises injecting a current waveform into the stator of the motor 210 using the FOC controller. Step 303 comprises measuring the current and voltage values responsive to the injected current waveform. Step 304 comprises transforming the measured current and voltage values into the d/q coordinate system. As noted above, the d/q reference frame used herein is the European notation and if the American notation for the d/q reference frame was used instead, the fundamental principles disclosed herein would still apply.

Step 305 comprises lowpass filtering the d/q coordinate transformed current and voltage values. Step 306 comprises determining an estimate for the Rs value ($\tilde{R}_2$) from the filtered d/q current and voltage values.

As described above, $\hat{R}_s$ can be used for improving motor operation including improving the efficiency during operation of the motor. Step 307 can comprise coupling $\tilde{R}_s$ to an input of an Id controller and Iq controller (as shown in FIG. 2A as 252 and 251 respectively), wherein each of the Id controller and Iq controller include an automatic gain adjustment algorithm configured to adjust their open loop gain as a function of $\hat{R}_s$, so that as $\hat{R}_s$ changes the automatic gain adjustment algorithm changes the open loop gain to reduce a change in open loop bandwidth during operation of the motor.

The Id controller 252 and Iq controller 251 can control an Rs/Ls circuit (motor phases), which is a single pole system. A relatively straightforward way to control such a circuit is to have pole cancelation, and to have a single parameter that sets the bandwidth of the controller. If Rs is fixed, then the pole cancelation of Rs/Ls can be calculated once. However, if Rs changes due to temperature during motor operation, then Rs/Ls changes with temperature so that the pole changes with temperature. If this pole frequency changes too much, it can lead to the Id controller 252 and Iq controller 251 undesirably oscillating. With $\hat{R}_s$ being updated by a FOC controller running a disclosed RSE algorithm, the current controller gain can be dynamically adjusted as $\hat{R}_s$ changes to cancel the Rs/Ls pole, thus providing improved stability for disclosed FOC controllers.

EXAMPLES

Disclosed embodiments are further illustrated by the following specific Examples, which should not be construed as limiting the scope or content of this Disclosure in any way.

FIG. shows experimental results using a FOC controller implementing a disclosed RSE algorithm tracking the Rs in a PM motor for approximately 5 minutes (x-axis) as the motor heated up during a loaded operating condition. The FOC controller implementing a disclosed RSE algorithm is seen to be able to track Rs in a stable manner during its rise and the steady state value of Rs of about 3.45 ohms is seen to be found for this particular test. The results can be seen to converge the new steady-state Rs (at the equilibrium operating temperature of the motor) value of about 3.45 ohms.

Benefits of disclosed RSE algorithms include a current injection that can be configured to not change the torque production of the motor. Rs estimation can be performed while the motor is stationary or is spinning, and does not require any added external circuitry or other components. Moreover, as noted above disclosed RSE algorithms can be applied to a variety of AC motors including PM, IPM and ACI motors, as well as brushless DC motors.

Disclosed RSE algorithms can be implemented for a variety of FOC-based motor controllers, for example for the Texas Instruments' INSTASPIN-FOC sensorless motor control technology, such as for PICCOLO and POTENZA MCU chip-based motor controllers. In the case of INSTASPIN-FOC technology and related technology, code for disclosed RSE algorithms can be embedded in the ROM of the MCU chip (see NV memory 272 in FIG. 2B), such as to accelerate motor control development while improving efficiency. Motor control applications include for washing machines, compressors, pumps, fans, electric bicycles, tools, treadmills, compact drives, sewing and textile machines, lifts and hobby motors.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A method comprising:
   injecting, by a controller, a current into a stator of a motor;
   measuring, by the controller, current and voltage values of the motor in response to the injected current;
   transforming, by the controller, the measured current and voltage values into transformed current and voltage values using a direct-quadrature coordinate system; and
   estimating, by the controller, a stator resistance for the motor based in part on the transformed current and voltage values.

2. The method of claim 1, wherein injecting the current waveform occurs while the motor is spinning.

3. The method of claim 1, further comprising filtering the transformed current and voltage values; and
   wherein estimating a value for a stator resistance is based in part on the filtered transformed current and voltage values.

4. The method of claim 1, wherein the motor comprises a permanent magnet (PM) motor, an interior permanent magnet (IPM) motor, an induction motor, or a brushless DC motor.

5. The method of claim 1, wherein the controller is operable to control direct current and quadrature current.

6. A controller adapted to be coupled to a motor and comprising one or more processors, wherein a memory is coupled to the processors and comprises instructions executable by the processors, the processors being operable when executing the instructions to:
   inject a current into a stator of the motor;
   measure current and voltage values of the motor in response to the injected current;
   transform the measured current and voltage values into transformed current and voltage values using a direct-quadrature coordinate system; and
   estimating a value for stator resistance for the motor based in part on the transformed current and voltage values.

7. The controller of claim 6, wherein injecting the current waveform occurs while the motor is spinning.

8. The controller of claim 6, wherein the processors are further operable when executing the instructions to filter the transformed current and voltage values; and
   wherein estimating a value for a stator resistance is based in part on the filtered transformed current and voltage values.

9. The controller of claim 6, wherein the motor comprises a permanent magnet (PM) motor, an interior permanent magnet (IPM) motor, an induction motor, or a brushless DC motor.

10. The controller of claim 6, wherein the controller is operable to control direct current and quadrature current.

11. One or more computer-readable non-transitory storage media in a controller, the one or more computer-readable non-transitory storage media embodying software that is operable when executed to:
    inject a current into a stator of a motor;
    measure current and voltage values of the motor in response to the injected current;
    transform the measured current and voltage values into transformed current and voltage values using a direct-quadrature coordinate system; and
    estimate a value for a stator resistance for the motor based in part on the transformed current and voltage values.

12. The media of claim 11, wherein injecting the current occurs while the motor is spinning.

13. The media of claim 11, wherein the software is further operable when executed to to filter the transformed current and voltage values; and
    wherein estimating a value for a stator resistance is based in part on the filtered transformed current and voltage values.

14. The media of claim 11, wherein the motor comprises a permanent magnet (PM) motor, an interior permanent magnet (IPM) motor, an induction motor, or a brushless DC motor.

15. The media of claim 11, wherein the controller is operable to control direct current and quadrature current.

* * * * *